Dec. 1, 1953  G. A. PEPLE, JR  2,660,946
DAMPER
Original Filed Sept. 2, 1943  3 Sheets-Sheet 1

INVENTOR
GUSTAVE A. PEPLE JR. DECEASED,
BY BANK OF COMMERCE AND TRUSTS EXECUTOR.
BY Pennie Davis Marvin, Edmonds
his ATTORNEYS Dec. 1, 1953  G. A. PEPLE, JR  2,660,946
DAMPER
Original Filed Sept. 2, 1943  3 Sheets-Sheet 2
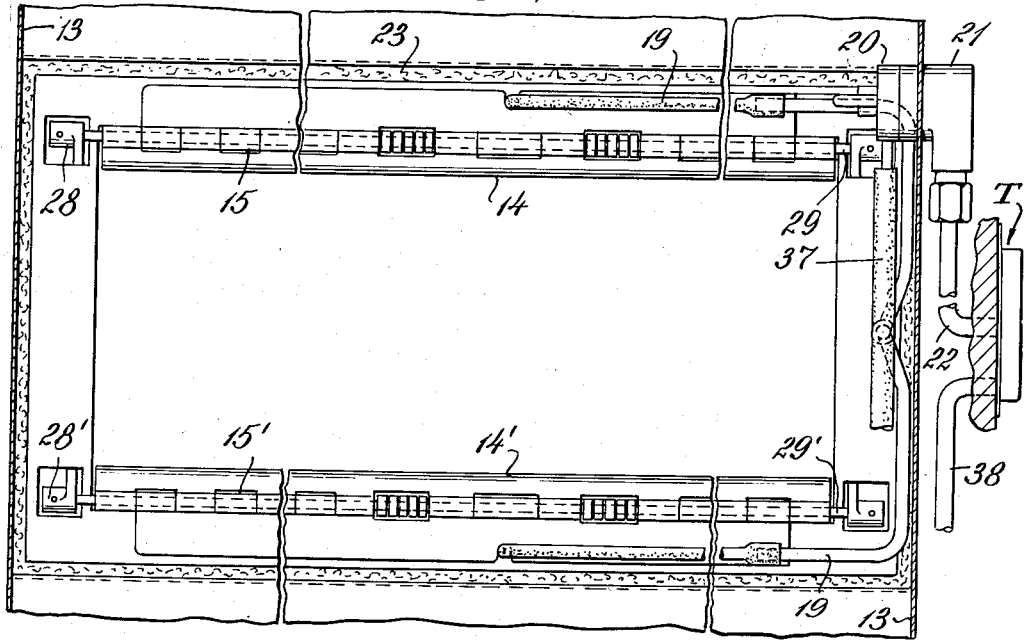
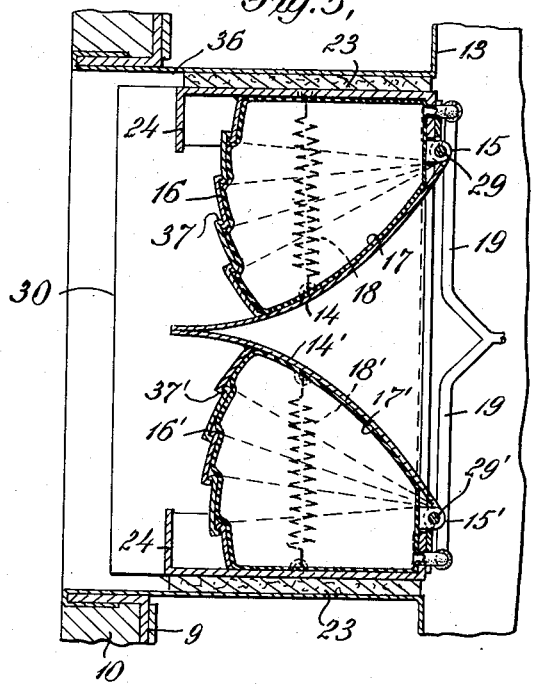
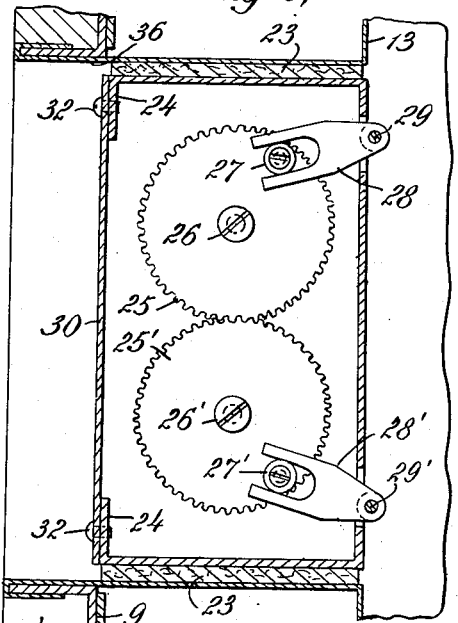
INVENTOR
GUSTAVE A. PEPLE JR. DECEASED,
BY BANK OF COMMERCE AND TRUSTS EXECUTOR.
BY Pennie Davis Marvin & Edmonds
his ATTORNEYS Dec. 1, 1953  G. A. PEPLE, JR  2,660,946
DAMPER
Original Filed Sept. 2, 1943  3 Sheets-Sheet 3
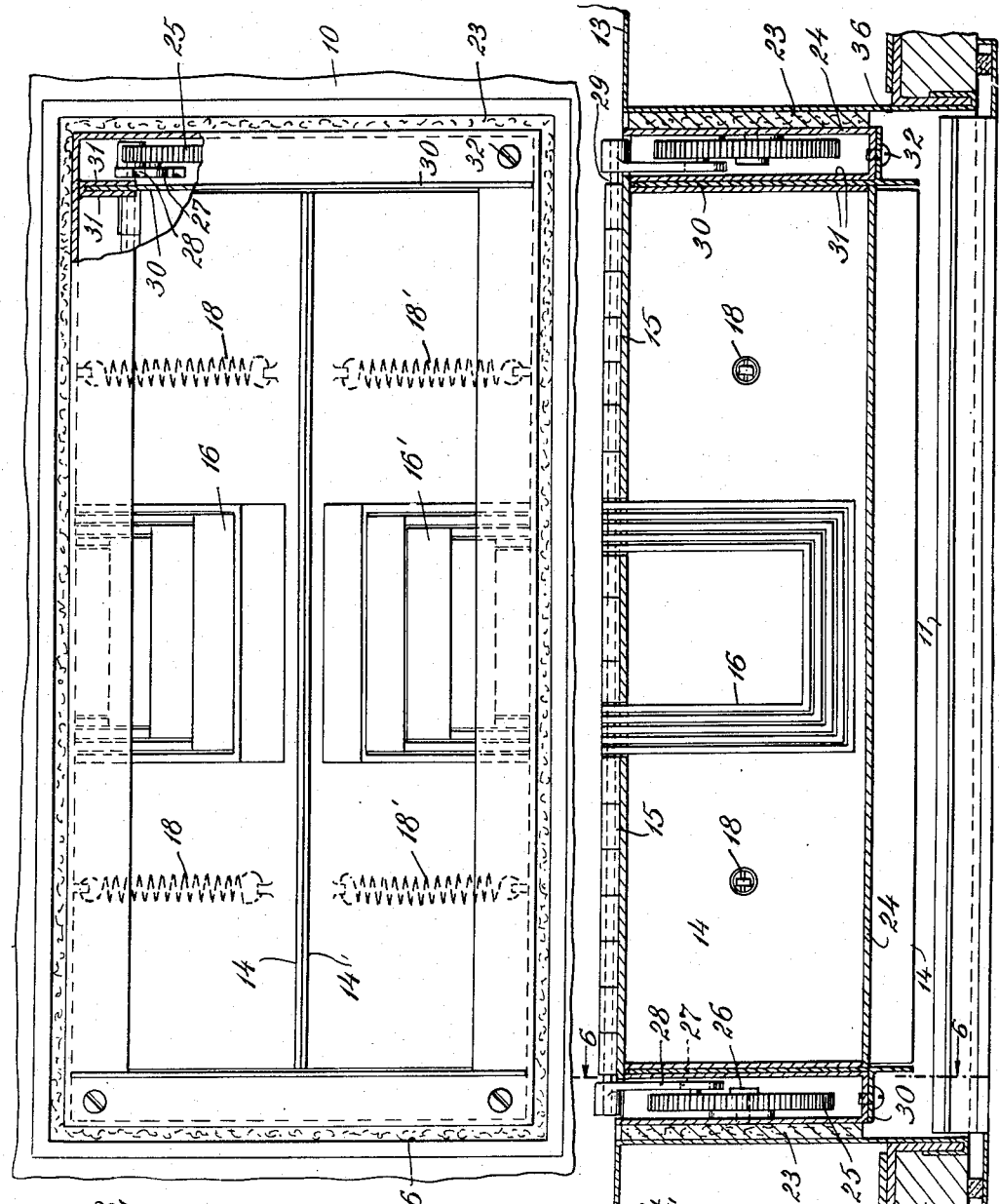
INVENTOR
GUSTAVE A. PEPLE JR. DECEASED,
BY BANK OF COMMERCE AND TRUSTS EXECUTOR.
BY Pennie Davis Marvin & Edmonds
his ATTORNEYS Patented Dec. 1, 1953

2,660,946

UNITED STATES PATENT OFFICE 2,660,946

DAMPER

Gustave A. Peple, Jr., deceased, late of Richmond, Va., by Bank of Commerce and Trusts, executor, Richmond, Va.

Continuation of application Serial No. 500,902, September 2, 1943. This application January 30, 1951, Serial No. 208,514

7 Claims. (Cl. 98—41)

This invention relates to dampers and more particularly concerns an improved damper and operating means therefor for use in regulating the volume of heated, cooled or otherwise conditioned air supplied to a room or other enclosure.

In Patent No. 2,281,615, there is disclosed an improved method and apparatus for supplying conditioned air to a room at constant velocity and in varying volume. The apparatus there disclosed includes an improved constant velocity damper comprising generally a pair of curved vanes or blades hinged at opposite sides of a duct and movable toward and away from each other. The present invention has to do with improvements in dampers of this general type, and in particular concerns an improved damper construction having power operating means for the blades entirely disposed within the frame of the damper inside of the air duct, but out of the path of the air flowing therethrough.

One object of the invention is to provide a damper of the type described having a motor mechanism for positively operating the blades, which mechanism is arranged and disposed out of the path of the air flowing through the damper and the duct controlled thereby, whereby no obstruction is offered to the air flow. Another object of the invention is to provide a damper construction of this type in which the damper blade operating motor mechanism is compactly disposed within the damper frame in such a manner that it neither protrudes in the path of the air, requires the provision of duct walls or other pockets or recesses nor entails increase in the overall dimensions of the damper frame or the duct in which the damper is disposed.

A further object of the invention is to provide a damper construction in which the blade operating motor acts directly on the damper blades without any intermediate power transmitting linkage or like means.

In the accompanying drawings there is illustrated a preferred embodiment of the invention. In the drawings:

Fig. 2 is a sectional elevation taken along the line 2—2 of Fig. 1 and viewed in the direction of the arrows;

Fig. 3 is a front elevation of the damper shown in closed position;

Fig. 4 is a sectional plan view taken along the line 4—4 of Fig. 1 and viewed in the direction of the arrows;

Fig. 5 is a vertical section through the damper and damper-motor mechanism showing the damper blades in closed position; and Fig. 6 is a sectional view taken along the line 6—6 of Fig. 4 and viewed in the direction of the arrows.

Figure 1:
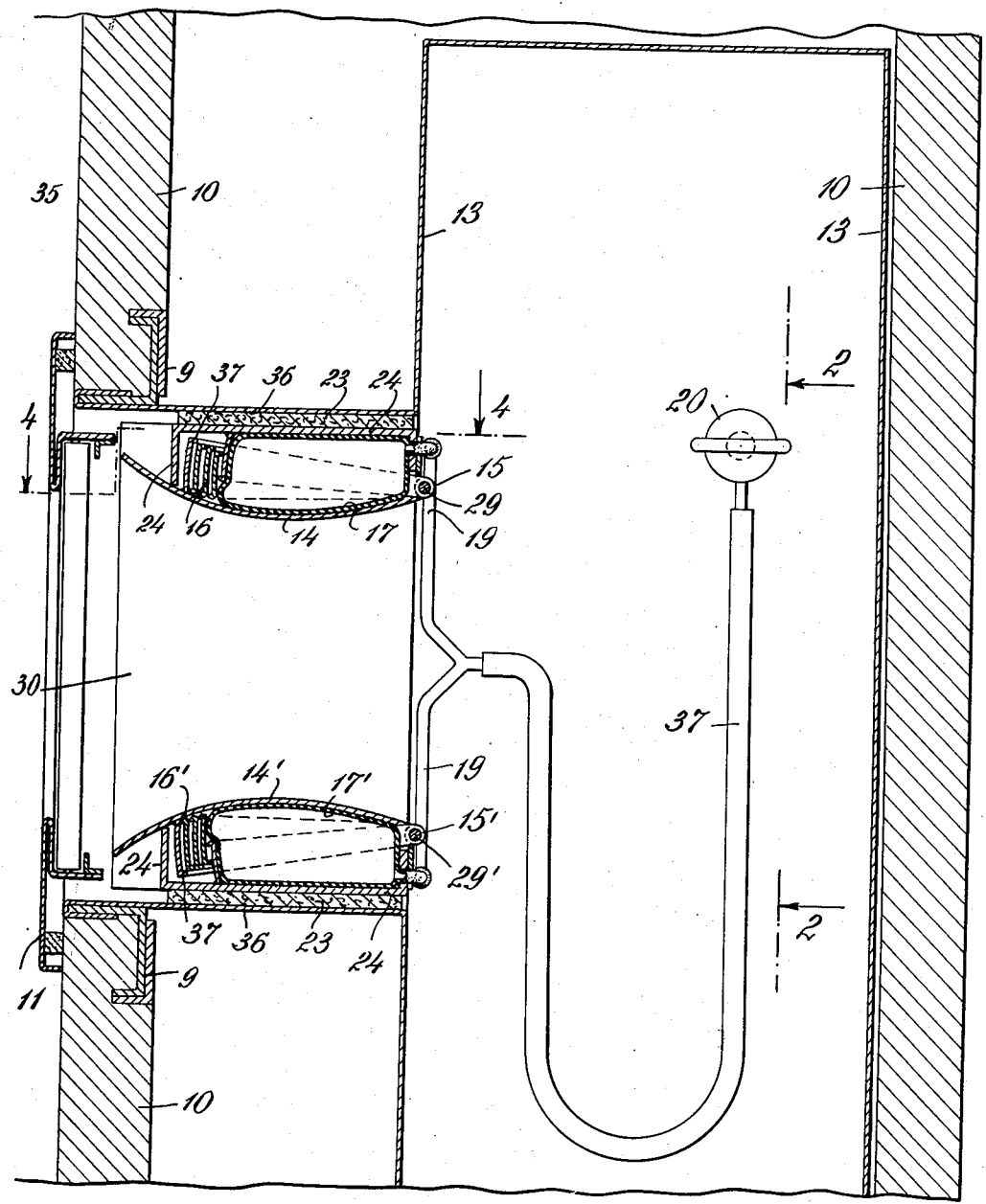
Fig. 1 is a vertical section through a room duct installation showing an embodiment of the damper of the present invention with its control mechanism.

Referring to the drawings, 13 indicates an air duct through which conditioned air is delivered from air conditioning apparatus of any suitable type to a room or other enclosure 35. A short branch duct 36, which may be of rectangular section, leads from the duct 13 through an opening in the wall 10 of the room and the forward face of the duct 36 is fitted with a grille 11 of known construction which may be provided with adjustable or fixed directional louvers in a manner known in the art. A metal ground 9 may be fastened to the wall 10 to receive the end of the duct 36, and the grille 11 may be suitably secured to the ground in accordance with known practice.

The damper proper includes a rectangular frame 24 fitted within the duct 36 and removably secured thereto by any suitable means. A strip of felt 23 may be inserted between the frame 24 and the duct wall to facilitate installation and form an air seal between these parts.

In the disclosed embodiment, the damper frame 24 is provided with two curved blades 14 and 14' which are respectively hinged along their rearward edges to the upper and lower walls of the frame 24 at its rearward end by the hinges 15 and 15'. The blades 14 and 14' are so positioned that when fully opened as shown in Fig. 1 they lie along the upper and lower walls of the duct formed by the frame 24 with their forward edges close to the opening in the grille 11. The blades 14 and 14' are movable about their pivots 15 and 15' to angular positions in which they extend across the duct and so reduce the volume of air flowing therethrough to a greater or less degree. When the blade ends are brought in contact as shown in Fig. 5, they substantially cut off the air flow. The blades 14 and 14' are preferably curved to present convex inner surfaces whereby a smooth burble-free passage for air is provided, but such curvature is not essential to the invention in its broader aspects.

In accordance with the invention, the blades 14 and 14' are moved to their angular positions by expansible motor mechanism disposed between each blade and the duct wall formed by the adjacent wall of the frame 24. In the disclosed embodiment, the expansible mechanism takes the form of resilient bags 17 and 17' of rubber or equivalent material disposed respectively between each of the blades 14 and 14' and the adjacent duct wall. Each of the bags 17 and 17' is preferably confined within an expansible housing. As shown, these housings may comprise a series of nested telescopically engaging U-shaped frames 16 and 16', all pivoted to the blade pivot 15 or 15'. The outermost of the nested frames is fixed to the adjacent wall of the damper frame 24, and the innermost of such frames 16 and 16' is fixed to the adjacent blade 14 or 14' as shown in Figs. 1 and 5. Oppositely disposed interengaging flanges 37 and 37' are provided along the opposite edges of adjacent pairs of the frames 16 and 16' as best shown in Fig. 5 and serve to limit the expanding movement of these frames. The arrangement is such that the outer ends of the blades 14 and 14' contact each other when the frames 16 and 16' are fully expanded (Fig. 5), whereas the blades lie along the duct walls formed by the frame 24 when the frames 16 and 16' are fully nested together as shown in Fig. 1.

The blades 14 and 14' are biased by suitable means to move toward their fully opened positions as the fluid pressure in the bags 17 and 17' is reduced. As shown, tensioned springs 18 and 18' may be suitably connected between the outer surfaces of the respective blades 14 and 14' and the adjacent upper and lower walls of the frame 24 for this purpose.

Means are preferably provided for interconnecting the blades 14 and 14' so that they move in unison, meet at the center of the duct when closed and maintain the center of the air stream at the center of the duct in all open positions. In the disclosed embodiment, the shafts 29 and 29' of the hinges 15 and 15' are fixed respectively to the blades 14 and 14' and bifurcated arms 28 and 28' fixed to the end of each of these shafts respectively engage rollers 27 and 27' eccentrically secured to intermeshing gears 25 and 25' of equal size. The gears 25 and 25' are journaled on suitable stub shafts 26 and 26' fixed to a side wall of the frame 24. A cover 30 separates the gear compartment from the blade compartment and is preferably supported in a slot formed by flanges 31 on the frame 24 as shown in Figs. 3 and 4. The cover 30 presents a smooth even surface at the ends of the blades 14 and 14' and so minimizes air leakage past the blades at this point. The cover 30 may be removably secured in place by screws 32 passing through a flange on the front end of the cover as shown in Figs. 3, 4 and 6. As shown in the drawing, the above described blade interconnecting mechanism may be duplicated at the opposite side of the frame.

The expansible bags 17 and 17' are supplied with air or other motive fluid under controlled pressure by any suitable means. As shown, interconnected tubing 19 connects both of the bags 17 and 17' to a flexible tube 37 within the duct 13, and the tube 37 is connected by means of suitable fittings 20 and 21 through the duct wall and by a tube 22 to a control instrument T located in or otherwise arranged to be responsive to air conditions in the room 35. The instrument T may comprise a thermostatic control device of known construction which acts to supply air at pressures that vary inversely with variations in room air temperature to the ducts 22, 37 and 19 and the expansible bags 17 and 17'. Air for this purpose may be supplied to the instrument T from any suitable compressed air source through the tube 38. Since thermostatically controlled air pressure controlling instruments of the type indicated are well known to those skilled in the art, a further description of the instrument T is unnecessary.

With the arrangement described, when due to a change in air conditions in the room such as a drop in temperature, an increase in the supply of conditioned air is required, the instrument T decreases the air pressure in the bags 17 and 17' and the damper blades 14 and 14' are moved apart by the springs 18 and 18' to admit increased volumes of air to the room. When less air is required, the instrument T increases the air pressure in the bags 17 and 17' and so moves the blades 14 and 14' closer together to reduce the volume of conditioned air supplied.

The disclosed construction can be considerably varied within the scope of the invention. On small dampers, one expansible power operating device may be used on one of the blades only, the other blade being operated through the interconnecting linkage from the power operated blade. Where the duct is small and constant velocity air supply is not essential, a single blade may be used. If desired, the bags 17 and 17' may be formed of flexible inelastic material which is readily collapsed by the force of the springs 18 and 18'.

This application is a continuation of application Serial No. 500,902, filed September 2, 1943, now abandoned.

What is claimed is:

1. A damper comprising a duct, two damper blades mounted in said duct for rotation, respectively, about axes adjacent opposite walls of said duct from fully opened positions in which the blades lie along the duct walls to positions in which the blades converge angularly at least partially across the duct, a flexible fluid tight bag disposed between at least one of said blades and the adjacent duct wall, a frame of telescoping members disposed around said bag between said blade and said wall, means interconnecting the blades to move in unison and means for supplying fluid under pressure to said bag to move said blades to convergent positions.

2. A damper comprising a duct, two damper blades mounted in said duct for rotation, respectively, about axes adjacent opposite walls of said duct from fully opened positions in which the blades lie along the duct walls to positions in which the blades converge angularly at least partially across the duct, a flexible fluid tight bag disposed between at least one of said blades and the adjacent duct wall, a series of nested telescopically interengaging frames surrounding said bag between said blade and said wall, means interconnecting the blades to move in unison and means for supplying a fluid under pressure to said bag to move said blades to convergent positions.

3. A damper comprising a duct, two damper blades mounted in said duct for rotation, respectively, about axes adjacent opposite walls of said duct from fully opened positions in which the blades lie along the duct walls to positions in which the blades converge angularly at least partially across the duct, a flexible fluid tight bag disposed between each of said blades and the adjacent duct wall, a series of nested telescopically interengaging frames surrounding each of said bags between the blades and the adjacent duct walls and forming laterally rigid and longitudinally expansible walls about each of said bags, means for biasing said blades toward their fully opened positions and means for supplying fluid under pressure to said bags to move said blades to convergent positions.

4. A damper comprising a duct, two damper blades mounted in said duct for rotation, respectively, about axes adjacent opposite walls of said duct from fully opened positions in which the blades lie along the duct walls to positions in which the blades converge angularly at least partially across the duct, a flexible elastic fluid tight bag disposed between each of said blades and the adjacent duct wall, a series of nested telescopically interengaging frames disposed around each of said bags between the blades and the adjacent duct walls and pivoted to the axes of said blades, said frames forming expansible enclosures for said bags, means for biasing said blades toward their fully opened positions and means for supplying fluid under pressure to said bags to move said blades to convergent positions.

5. A damper comprising a duct, at least one damper blade mounted in said duct for rotation about an axis adjacent one wall of the duct from a fully opened position with the blade lying along and adjacent one wall of the duct to positions with the blade extending angularly across the duct, a flexible fluid tight bag disposed between the blade and the adjacent duct wall, a series of nested telescopically interengaging frames disposed about said bag between the blade and the adjacent duct wall and pivoted to turn about the axis of said blade, said interengaging frames forming a laterally rigid longitudinally expansible wall about said bag, means for biasing said blade toward its fully opened position and means for supplying a fluid under pressure to said bag to move said blade to an angular position across said duct.

6. In a building structure a wall, a duct behind the wall, a branch duct having its end extending into an opening in said wall, a damper in said branch duct pivoted for movement about an axis adjacent one wall of said branch duct and parallel with the wall of said building, said pivot being positioned to provide a space between the adjacent wall of said branch duct and said damper, and a motor for operating said damper comprising a flexible bag attached to the wall of the duct and positioned in the space between said damper and the adjacent face of said duct and a member having portions embracing said bag when collapsed and movable with said damper when said bag is distended, said bag being otherwise free of said damper.

7. In a building structure a wall, a duct behind the wall, a branch duct having its end extending into an opening in said wall, a damper in said branch duct pivoted for movement about an axis adjacent one wall of said branch duct and parallel with the wall of said building, said pivot being positioned to provide a space between the adjacent wall of said branch duct and said damper, and a motor for operating said damper comprising a flexible bag attached to the wall of the duct and positioned in the space between said damper and the adjacent face of said duct, and a member having portions embracing said bag when collapsed and movable with said damper when said bag is distended, said bag being otherwise free of said damper, said building wall having a facing member covering the exposed end of said branch duct and with the marginal portion projecting partially across said duct at the side where said motor is located.

BANK OF COMMERCE AND TRUSTS,
By T. J. HEADLEE,
   *Vice-President and Trust Officer,*
*Executor of the estate of Gustave A. Peple, Jr., deceased.*

References Cited in the file of this patent
UNITED STATES PATENTS

| Number | Name | Date |
|---|---|---|
| 1,438,981 | Christensen | Dec. 19, 1922 |
| 2,157,025 | Snediker | May 2, 1939 |
| 2,224,312 | O'Day | Dec. 10, 1940 |
| 2,256,467 | Hoof | Sept. 23, 1941 |
| 2,281,615 | Peple, Jr. | May 5, 1942 |
| 2,283,021 | Udale | May 12, 1942 |
| 2,320,007 | Otto | May 25, 1943 |